United States Patent [19]

Schüssler

[11] 4,441,180
[45] Apr. 3, 1984

[54] SERVICE INTEGRATED COMMUNICATION TRANSMISSION AND INTERCHANGE SYSTEM

[75] Inventor: Hans Schüssler, Backnang, Fed. Rep. of Germany

[73] Assignee: Licentia Patent-Verwaltungs-GmbH, Frankfurt am Main, Fed. Rep. of Germany

[21] Appl. No.: 155,132

[22] Filed: May 30, 1980

[30] Foreign Application Priority Data

Jun. 1, 1979 [DE] Fed. Rep. of Germany ....... 2922418

[51] Int. Cl.³ ............................................. H04B 9/00
[52] U.S. Cl. ........................................... 370/3; 370/4; 455/607; 455/612
[58] Field of Search .................... 370/1, 3, 4; 455/612, 455/606, 607; 358/86, 85

[56] References Cited

U.S. PATENT DOCUMENTS

| 3,953,727 | 4/1976 | d'Auria et al. | 370/3 |
| 4,061,577 | 12/1977 | Bell | 370/3 |
| 4,150,258 | 4/1979 | Fujimoto | 370/56 |

FOREIGN PATENT DOCUMENTS 2538638 3/1977 Fed. Rep. of Germany ...... 455/612

OTHER PUBLICATIONS

Hara-Conceptual Design of a Switched Television Distribution System Using Optical Fiber Waveguides-IEEE Trans on Cable TV-vol. CATV-2-#3, Jul. 1977 pp. 120-130.

Coyne et al.,-Integrated Broadband Distribution System for Low Density Rural Areas using Optical Fiber Transmission-Int. Symposium on Subscriber Loops & Servies (Conf) Atlanta, Ga. Mar. 20-24, 1978, pp. 44-48.

Ishio et al.,-A Two Way Wavelength-Division-Multipexing Transmission and its Application to a Switching TV-Distribution System-4th European Conf. on Optical Comm.-1978-pp. 646-655.

Campbell-Multiterminal Fiber Systems-Laser Focus--Jun. 1971, pp. 42, 44, 45.

Horak-TV Program Distribution over Fiber CATV Networks-Conf. Internat. Broadcasting Conv.-London, Eng.-Sep. 20-24, 1976, pp. 228-231.

Primary Examiner—Joseph A. Orsino, Jr.
Attorney, Agent, or Firm—Spencer & Frank

[57] ABSTRACT

A service integrated communications transmission and switching system for audio, video and data, between a user terminal and a central switching station of a telephone system wherein the line connecting the user terminal with the switching station includes at most one light-conductive fiber which is utilized in wave multiplex duplex operation for the transmission and reception of signals from and to the user terminal; the narrowband services are provided by means of digital transmission with analog to digital and digital to analog conversion and multiplex and demultiplex taking place at the user end; and the broadband services are provided by means of analog transmission.

7 Claims, 9 Drawing Figures

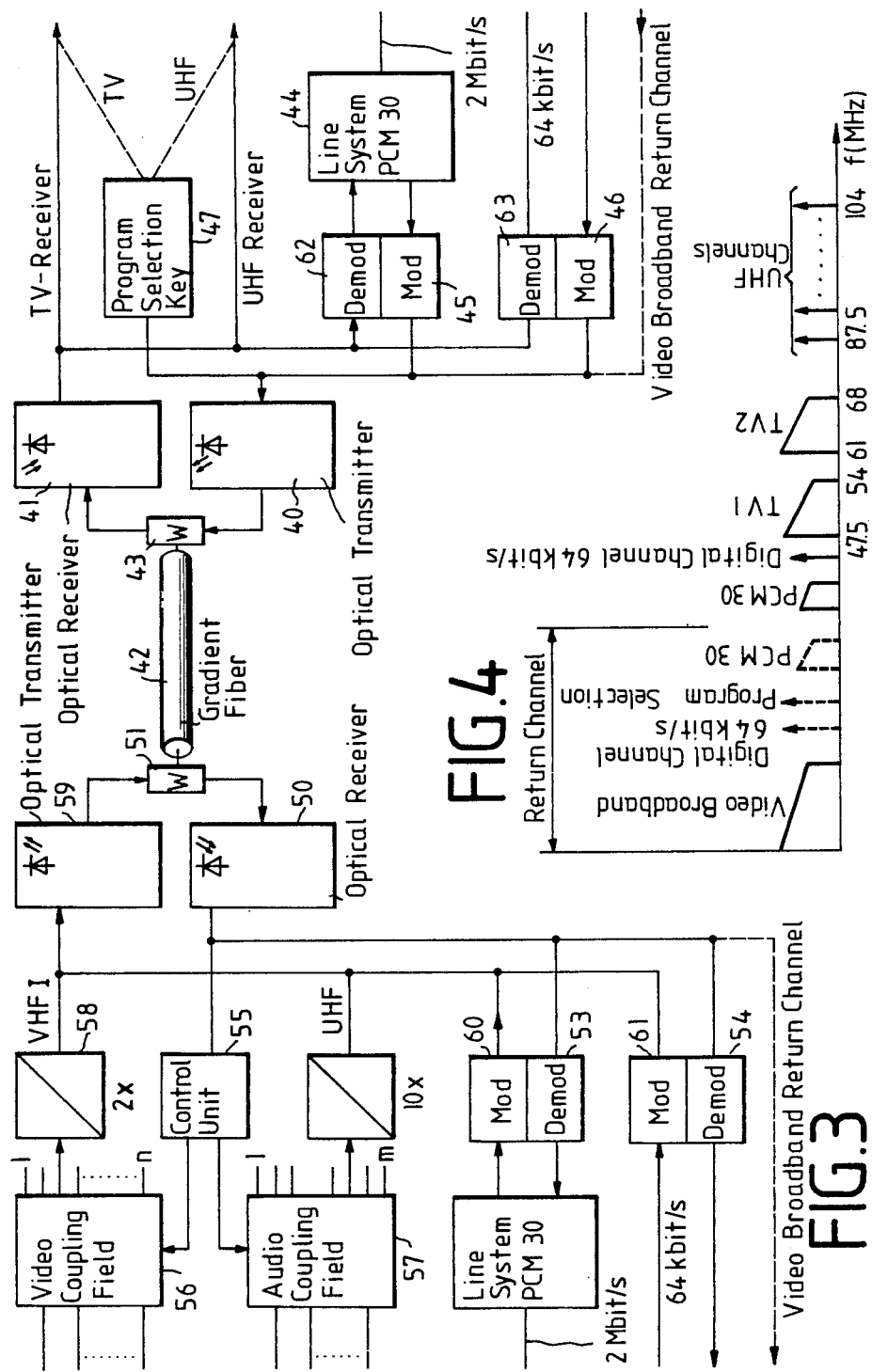

FIG. 7
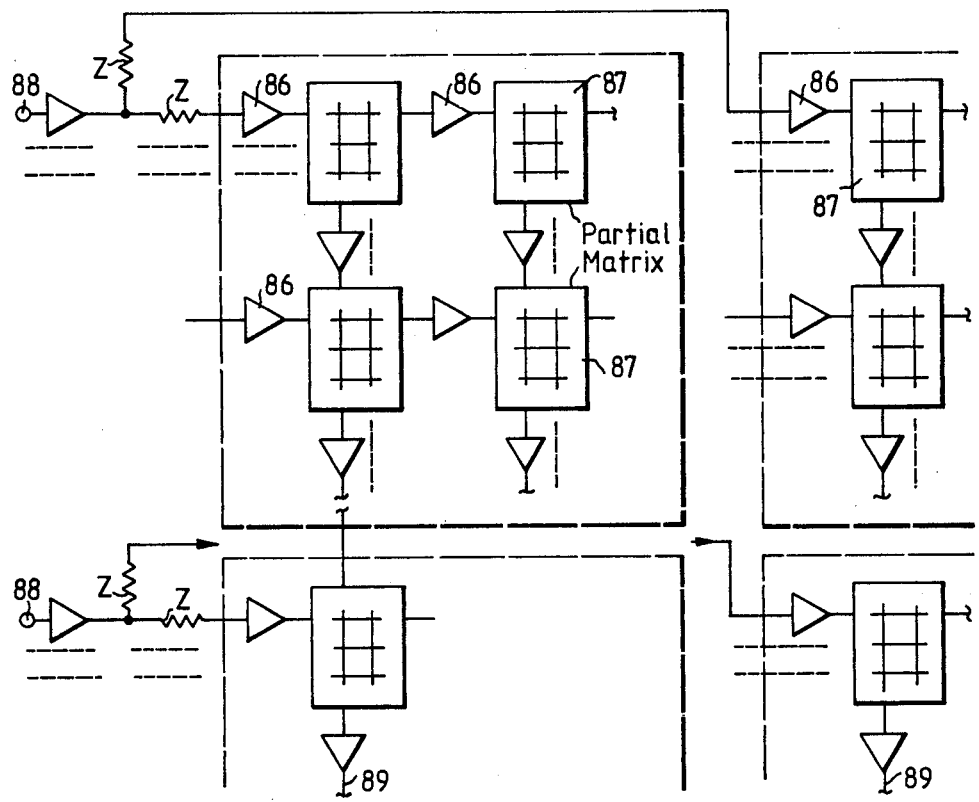
FIG. 7a
FIG. 7b
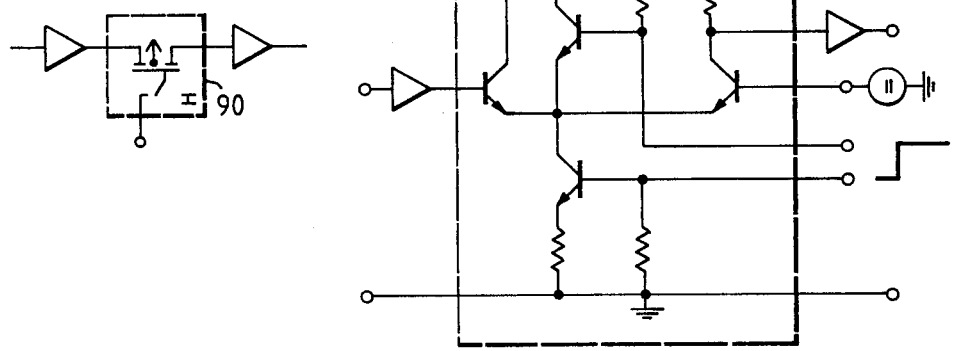

SERVICE INTEGRATED COMMUNICATION TRANSMISSION AND INTERCHANGE SYSTEM

BACKGROUND OF THE INVENTION

The present invention relates to a service integrated communication transmission and interchange system for audio, video and data.

A communications system of this general type is disclosed in German Offenlegungsschrift (Laid-open application) No. 2,538,638, published Mar. 3rd, 1977, in which each telephone user connected to the communication system is connected with the associated central office by means of two separate glass fibers which both transmit time multiplexed telephone and video signals or, instead of the telephone signals, data signals, respectively. Moreover, according to this disclosed system, one of the fibers is used as the transmitting fiber and the other of the fibers is used as the receiving fiber and video coupling fields are provided in the telephone central office for video communication and/or to switch through television signals. However, this integrated communications system suffers from the disadvantage that it is relatively expensive to realize.

SUMMARY OF THE INVENTION

It is therefore the object of the present invention to provide a communications system which is much less expensive, wherein new services in particular can be introduced without complicated new installations and which has a network structure that offers opportunities for expansion in order to provide broadband services and makes possible the utilization of novel technological methods for semiconductor circuits and fiber optic transmission paths.

The above object is basically achieved according to the present invention in that in a service integrated communications transmission and switching system for audio, video and data between a user terminal and a central or local switching station or office of a telephone system, a single light-conductive fiber is used as the transmission line between the user terminal and the switching station, signals are transmitted via the single light-conductive fiber in wave multiplex duplex operation with the signals for the narrowband signals being transmitted in digital form or the signals for the broadband services being transmitted in analog form, or with the required analog to digital or digital to analog conversion, and multiplexing or dumultiplexing of the transmitted signals taking place at the user terminal.

More specifically, the above object is achieved in a service integrated communications transmission and switching system for audio, video and data between a user terminal and a local or central switching station of a telephone system wherein the user terminal includes, in addition to a telephone device, at least one device for a narrowband service for digital data or at least one device for a broadband service such as video or audio broadcasting, means connecting the user terminal to the switching station so that signals may be transmitted in both directions between the user terminal and the switching station, by the improvement wherein: the means connecting the user terminal to the switching station consists of a single light-conductive fiber; the user terminal and the switching station each includes respective means connected to the light conductive fiber for transmitting and receiving an optical carrier signal via the light-conductive fiber in duplex operation; and the user terminal includes an analog to digital and digital to analog converter for the signals from and to the telephone device respectively, means for combining the digital signals produced from the telephone signals and by the narrowband service devices in the user terminal, or any analog signals produced in the user terminal by the devices of the broadband services in wave multiplex and for supplying the resulting electrical signal with the multiplexed digital and analog signals to the respective means for transmitting optical signals for conversion to a corresponding optical signal for transmission via said light-conductive fiber, means connected to the respective means for receiving optical signals, for converting the received multiplexed optical signals to a correspondingly multiplexed electrical signal, for demultiplexing the received digital and analog signals, and for supplying same to the associated devices of the user terminal.

According to further features of the invention, at least one preliminary field concentrator is disposed in the signal path between the single light-conductive fiber and the switching station with the concentrator having multiplex functions for the digital signals for the narrowband services and switching functions for the analog signals for the broadband services; the concentrator or the switching office include means for switching the sigital signals for the narrowband services in time multiplex or for switching the analog signals for the broadband services in space multiplex; or light-conductive fiber systems are used for the connections between the concentrator and the switching office, or between switching offices or between concentrators if more than one is required.

The communications system according to the invention offers the advantages of low investment costs by savings in the user terminal lines, low operating and maintenance costs, and simultaneous utilization of all services for all users. Moreover, an integrated transmission and switching technique can be used and it is possible to expand service in stages.

BRIEF DESCRIPTION OF THE DRAWINGS

FIG. 3 is a block circuit diagram of another embodiment of an integrated communication system according to the invention.

FIG. 4 illustrates an example of the channel division for the system of FIG. 3.

FIGS. 7, 7a and 7b illustrate a coupling field space division matrix with semiconductor cross points.

DETAILED DESCRIPTION OF THE PREFERRED EMBODIMENTS

Figure 1:
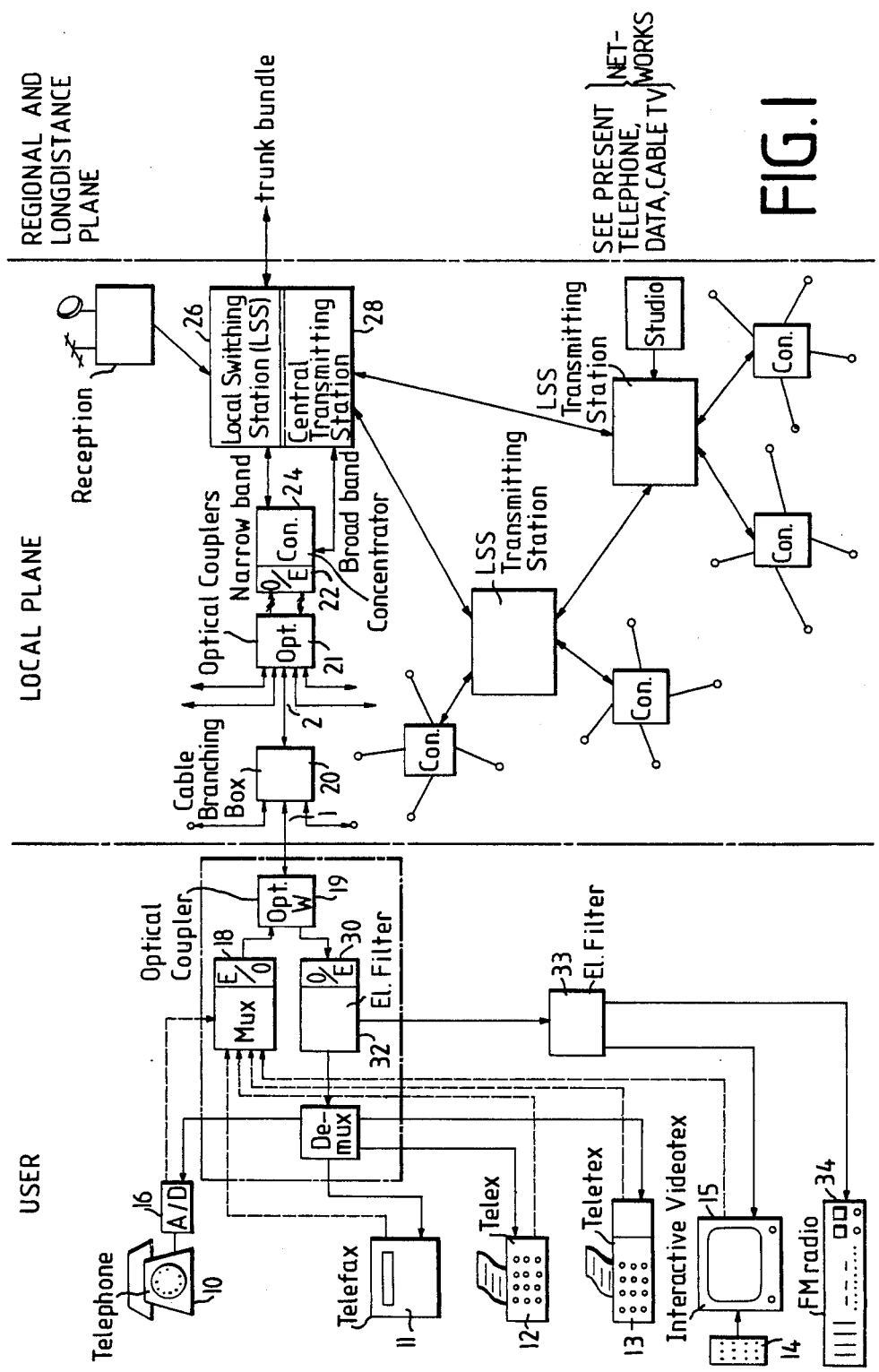
FIG. 1 is a block circuit diagram of one embodiment of a service integrated communication system according to the invention.

Turning now to FIG. 1, there is shown an embodiment of the service integrated communications system according to the invention in which the system has been divided into three regions, i.e., local plane, and regional and long distance plane. At the user terminal there are available, in addition to the conventional telephone service indicated by the telephone device 10, a plurality of new narrowband services such as, for example, Telefax, Telex, Teletex, Interactive Videotex and still picture transmission. In order to transmit the information from the end instruments 11–15 for these services which information is already conventionally available in digital form, the outputs of the end instruments 11–15 are each fed to a multiplexer Mux where they are combined with the output signals from an analog to digital converter 16, which provides the digitalized voice channel and the telephone signalling produced by the telephone device 10, and with the signals of a control information channel to form a digital data flow. The entire bit flow of the multiplexer Mux is fed to an electro-optical transducer 18 whose output is coupled, via an optical terminating set (optical coupler) 19, into the user line 1, which has only a single light-conductive fiber, for transmission to the central or local switching station. In a cable branching or connection box 20, a plurality of user lines 1 are combined into light-conductive cables 2 which are fed, via optical terminating sets 21, and (optical coupler) optical-electrical converters 22 to a concentrator 24. In the concentrator 24, the narrowband signals are separated from the broadband signals not shown in FIG. 1 with the narrowband signals being fed to the local switching station 26 and the broadband signals being fed to the central transmitting station 28 of the local switching stations or office 26 or to another transmitting station of the local switching office. The local switching station 26 is connected, in the usual manner, to the regional and long-distance plane of the telephone network via electrical cables and/or to data networks for data connections and/or to broadband networks, for example, cable television networks, for broadband services.

In the return direction, the information travels via end or local switching office or station, e.g. 26, concentrator 24, electro-optical transducers 22 and optical terminating (optical couplers) 21 to the light conductive cable 2 which at the cable branching box or location 20 is divided into the respective user terminal lines 1 each comprising a single light-conductive fiber. After passing through the optical terminating sets (optical couplers) 19, the optical signals are converted to electrical signals in an optical to electrical transducer 30. of course, the functions of the transducers 18 and 30 can also be performed by a suitable combined electro-optical, optoelectrical transducer. In an electrical filter 32, broadband analog television and radio signals are separated from the digital signal of the narrowband services and are fed via a further electrical filter 33 directly to the respective end instruments 15 and 34. The digital narrowband signals are fed to a demultiplexer Demux which separates the informations for the individual narrowband services and feeds them to the respective end instruments 10–13, digital to analog conversion in the converter 16 being required before or in the telephone instrument 10 for the voice signal.

Figure 2:
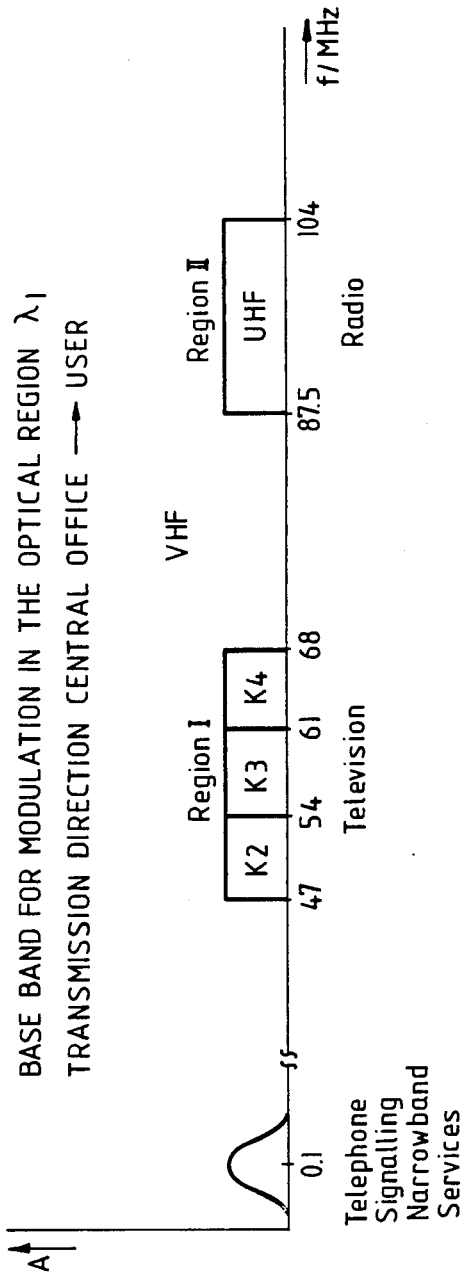
FIG. 2 illustrates an example of the modulation division which can be used with the system of FIG. 1.

Referring now to FIG. 2, there is shown a possible modulation division for transmission on an optical user terminal line according to the invention, e.g., as shown in FIG. 1. Two-way or duplex operation on a single light-conductive fiber is realized in that optical transmitting and receiving elements are provided which operate at a different frequency in each of the transmission directions and thus multiwave operation is realized. The transmission direction to the user has associated with it an optical region or wavelength $\lambda 1$, while the transmission direction from the user terminal to the central office has associated with it a different optical region of wavelength $\lambda 2$. Preferred ranges of wavelengths $\lambda 1$ and $\lambda 2$ are 0.78 to 0.92 $\mu$m and 1.05 to 1.6 (1.3 to 1.55) $\mu$m, respectively.

In both transmission directions, the base band for modulation of the optical carrier contains in the lower region up to about 0.2 MHz, the narrowband services, telephone and signalling as well as a control information channel in the return direction from the user to the central office for the selection of, for example, certain cable television channels which are received in VHF band region I. Additionally, the base band for modulation of the optical signal in the region $\lambda 1$ includes the UHF radio band region II. Of course, it is also possible to further expand the radio-television regions II to V for motion picture transmission, teleconference capability, etc. Although not shown in this Figure, the return direction may also additionally contain a broadband video channel (two-way cable television). The type of modulation of the broadband systems corresponds to that of radio reception, while for the transmission of voice, signaling and the new narrowband services, digital channels are provided which each process, for example, 64 kbit/s. For quality reasons it may be preferable, under certain circumstances, to provide separate video and audio transmission for television.

It is, of course, understood that the narrowband signals may be given different carriers than those shown in FIG. 2. For example, the carriers for the narrowband signals may be changed in such a way that the video band is kept free for video transmission.

Although is is not required according to the invention that a concentrator such as concentrator 24 be provided between the cable branching station 20 and the digital telephone switching station, if such a concentrator is provided it preferably has the ability to separate the control information of the return channel and feed it to a control device for evaluation, and to switch the broadband distribution signals with the aid of a space multiplex broadband coupling field, to the individual user terminals. With advances in the semiconductor art it is conceivable that monolithic solutions may be used in the future for such coupling fields. The concentrator, additionally, preferably has the ability to separate the telephone signaling from the digital signals. for the voice transmission and/or for the new services, respectively. Such a concentrator thus would possess time multiplexing or demultiplexing functions for the narrowband digital signals and space multiplexing functions for the broadband signals.

Moreover, since 30 PCM telephone systems are already being formed in the concentrator, there exists the possibility of performing part of the switching functions already in the concentrator. Finally, depending on the degree of penetration of the new services, it may also be advisable to combine individual ones of the services into different transmission systems.

In some cases, there may also be a need for a second concentrator stage. According to the invention, light-conductive systems can also be used with advantage for the transmission paths between concentrator and switching office or between individual concentrators, respectively, as well as for local connecting paths. Digital light-conductive systems for 8, 34 and 140 Mbit/s can be operated on the same cables and permit flexible adaptation to requirements. It is expected that all such optical paths can be realized without intermediate amplifiers. The above-mentioned systems could also be used for the trunk lines as a connection of the local network toward the outside. However, in such case, the path attenuation and the dispersion in systems employing gradient fibers and lightwaves of 860 nm wavelength would require the use of repeaters.

Figure 5:
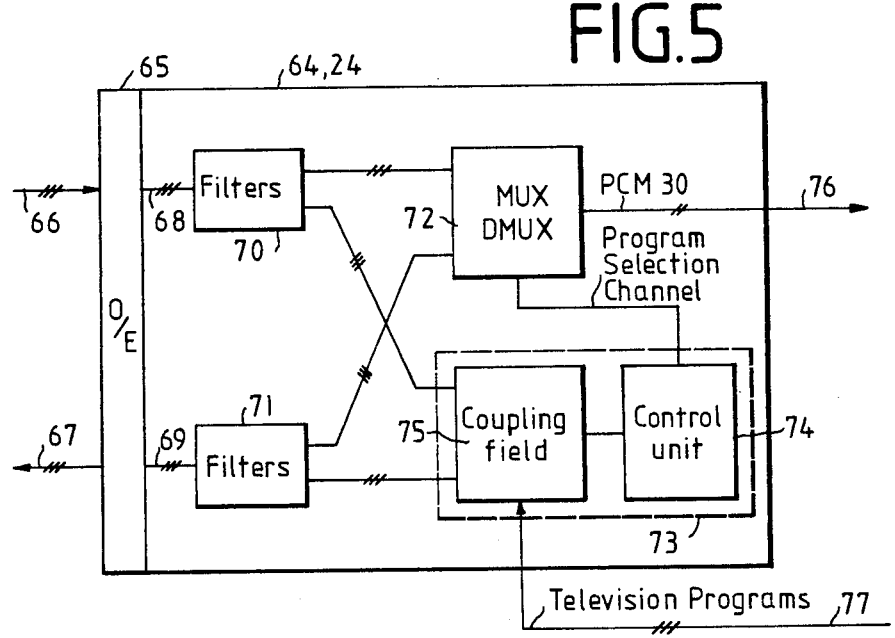
FIG. 5 illustrates a rough survey of the functional parts of a concentrator.

FIG. 5 shows an embodiment of a concentrator 64, which consists of a plurality of optoelectrical and electrooptical transducers 65, which connect the optical lines 66, 67 to the electrical inputs 68 and outputs 69 of the concentrator on the subscriber side; filters 70, 71 for separating the different services; a multiplexing and demultiplexing unit MUX/DMUX 72 for bundling and debundling the narrowband channels; and broadband switching unit 73, which consists of control unit 74 and a coupling field 75 for switching the ordered television and broadcasting channels to the subscriber lines. The concentrator is connected with PCM line systems 76 to the switching office for narrowband services and to a plurality of broadband lines 77 for distributing television and broadcasting channels.

Figure 6:
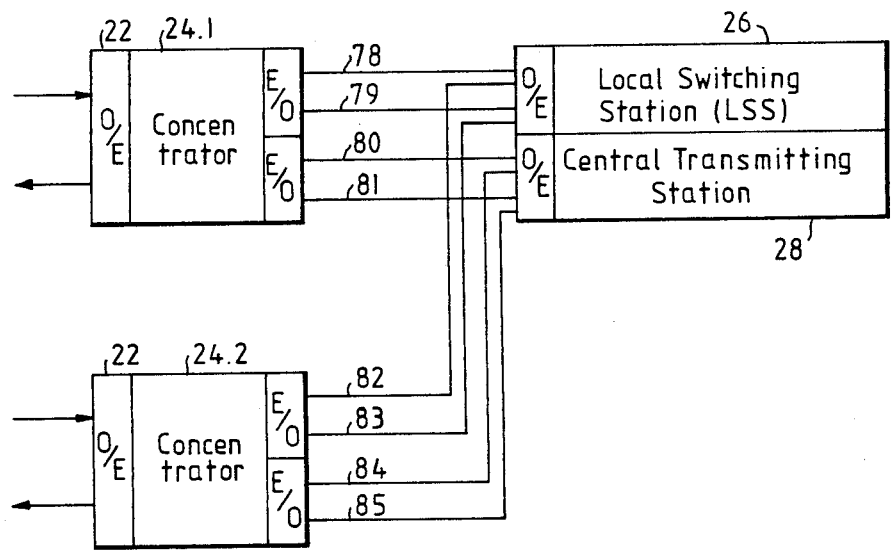
FIG. 6 shows a network configuration with 2 concentrators and a central switching office and optical connecting lines.

In FIG. 6 the concentrators 24.1, 24.2 are connected to the local switching office 26 central transmitting station 28 by optical lines 78,79; 80,81; 82,83; 84,85. Each line needs electrooptical and optoelectrical transducers at the ends, which are incorporated in the concentrators 24.1, 24.2 and in the stations 26 and 28. The lines 78,79; 82,83 transmit the narrowband signals, the lines 80,81; 84,85 and used for broadband transmission.

FIG. 7 illustrates a part of a broadband coupling field, which consists of a plurality of amplifers 86 and partial matrices 87 and which has to connect inputs 88 to outputs 89 for broadband signals. Semiconductor switches may be used. An analog switch in MOS-technology 90 is illustrated in FIG. 7a. An advantageous arrangement for a switch consisting of a switched amplifier in bipolar technology which can be realized in a length frequency technology is shown in FIG. 7b.

FIG. 3 shows a further embodiment of the communications system according to the invention in which the user terminal (right half) is connected via a single light-conductive fiber (center) to a central switching office (left half). This system, in which advantageously laser transmitters of high linearity and gradient fibers of low dispersion are used, is designed for the transmission of two television and ten UHF programs in the forward direction, one 64 kbit/s digital channel, a PCM 30 system in both directions and, if required, a broadband video return channel with a digital narrowband channel for program selection. The channel division for this system is shown in FIG. 4.

As shown in FIG. 3, the user terminal includes an optical transmitter 40 and an optical receiver 41 which are each coupled to one end of the light conductive fiber 42 via an optical coupler 43. The digital signals generated at the user terminal by the PCM 30 line system and from the 64 kbit/s channel are each fed to respective modulators 45 and 46, respectively, wherein the respective carriers are modulated with the digital information. The output signals from the modulators 45 and 46 are, in turn, fed to the input of the optical transmitter 40 wherein they are combined or multiplexed with a digital signal from a program selection key 47 and the broadband signal of the video return channel, converted to an optical signal, and transmitted to the central station via the optical or light-conductive fiber 42. The program selection key produces digital output signals indicating which of the ten UHF radio channels and which of the two video channels are desired.

At the central station, the optical signals transmitted by the transmitter 40 are received by an optical receiver 50, which is coupled to the transmission fiber 42 via an optical coupler 51, wherein, in a known manner, the carriers for the various channels are separated and converted to corresponding modulated electrical waves which are then fed to the devices of the associated channels. In particular, the digital signals for the PCM 30 line system channel are fed to a demodulator 53, the digital signals for the 64 kbit/s channel are fed via a demodulator 54 to a video receiver (not shown), while the digital signal from the program selection key is fed to a control unit 55. The control unit 55 evaluates the received signal and, controls a video coupling field 56 and/or an audio coupling field to switch the desired ones of n video signals available at the input of the coupling field 56 to the two selected outputs. The video signals appearing at the two selected outputs are fed to respective modulators 58 (only one of which is shown) wherein they are modulated onto the desired carrier for the selected VHF channel and fed to the optical transmitter 59 for transmission to the user terminal. In a similar manner, the control unit 55 causes the audio coupling field 57 to switch through the desired ten audio channels which are fed to respective modulators whose output is likewise connected to the optical transmitter 59. Since, as indicated above, the system is to have two-way transmission of the PCM 30 line system channel and for the 64 kbit/s digital channel, the signals of these channels which are to be transmitted to the user station are initially fed to modulators 60 and 61, respectively, whose outputs are likewise fed to the optical transmitter 59.

At the user terminal, the signals transmitted by the optical transmitter 59 via the signal light-conductive fiber 42 are received by the receiver 41, converted to corresponding electrical signals and fed to the associated end instruments. In particular, the analog television and radio signals are fed to the television receiver and UHF receiver, respectively, while the digital signals from the PCM line system modulator 60 and 64 kbit/s modulator 61 are demodulated in the respective demodulators 62 and 63 for the associated channels at the user terminal or station.

Such a communications network also perfectly meets the requirements of internal information exchanges and is advantageously suited for equipping lecture or meeting rooms of schools or conference centers.

It will be understood that the above description of the present invention is susceptible to various modifications, changes and adaptations, and the same are intended to be comprehended within the meaning and range of equivalents of the appended claims.

What is claimed is:

1. In a service integrated communications transmission and switching system for audio, video and data between a user terminal and a local switching station of a telephone system wherein said user terminal includes, in addition to a telephone device with an associated code converter for the transmission and reception of telephone signals in digital form, at least one device for a narrowband service for digital data and at least one device for a broadband service with analog data signals such as video or audio broadcasting, and wherein means are provided for connecting said user terminal to said local switching station so that signals may be transmitted in both directions between said user terminal and said local switching station, the improvement wherein: said means for connecting said user terminal to said local station comprises a single light-conductive fiber having one end connected to said user terminal, and a preliminary field concentration means, connected between the other end of said single light-conductive fiber and said local switching station, for connecting signals from and to a plurality of user terminals to said local switching station; said user terminal includes respective means connected to said light-conductive fiber for transmitting and receiving an optical carrier signal modulated with the data to be transmitted via said light-conductive fiber in wave multiplex duplex operation, with said means for transmitting and receiving an optical signal at said user terminal receiving only a modulated optical signal in a first optical region and transmitting only an optical signal in a second optical region; and said concentrator means includes: first means for coupling signals to be transmitted to said user terminal and decoupling received signals from said user terminal to and from said light-conductive fiber; second means, connected to said first means, for separating analog signals for said broadband services and digital signals for said narrowband and telephone services received from said user terminal into the individual services and for combining analog and digital signals to be transmitted to said user terminal in said first optical region; third means, connected between said second means and said local station, for time multiplexing digital signals for said narrowband and telephone services received from said second means and for transmitting these signals to said local station, and for time demultiplexing digital signals for said narrowband and telephone services received from said local station and supplying the time demultiplexed signals to said second means for transmission to said user terminal; and fourth means, connected to said second means, and for directly establishing a connection for the analog signals for said broadband services between said user terminal and said local station by switching in space multiplex.

2. A system as defined in claim 1 wherein said single optical fiber is a gradient fiber.

3. A system as defined in claim 1 wherein semiconductor coupling elements are used to switch said analog signals for said broadband services.

4. A system as defined in claim 1 including a plurality of said concentrators and wherein a light-conductive system is used for the data connections between said plurality of said concentrators.

5. A system as defined in claim 1 including a plurality of said switching stations and wherein a light-conductive system is used for the data connections between said plurality of switching stations.

6. A system as defined in claim 1 wherein a light-conductive system is used for the data connections between said concentrator and said switching station.

7. A system as defined in claim 1 or 6 wherein: said system is provided with broadband radio channels in at least one broadcast band for transmission to said user terminal, with a narrowband digital information control channel for transmission from said user terminal to said central switching station, and with a telephone channel, a signaling channel and narrowband service channels for transmission in both directions.

* * * * *